United States Patent [19]
Bauer et al.

[11] 3,957,751
[45] May 18, 1976

[54] WATER-SOLUBLE REACTIVE DYESTUFFS OF THE MONOAZO SERIES CONTAINING AN ACTIVE METHYLENE COUPLING COMPONENT

[75] Inventors: August Bauer; Ernst Hoyer, both of Frankfurt am Main, Germany

[73] Assignee: Hoechst Aktiengesellschaft, Frankfurt am Main, Germany

[22] Filed: Jan. 10, 1973

[21] Appl. No.: 322,374

[30] Foreign Application Priority Data
Jan. 12, 1972 Germany............................ 2201280

[52] U.S. Cl............................... 260/193; 260/152; 260/153; 260/154; 260/155; 260/156; 260/157; 260/158
[51] Int. Cl.² .................... C09B 29/32; C09B 29/36
[58] Field of Search...................................... 260/193

[56] References Cited
UNITED STATES PATENTS

| | | | |
|---|---|---|---|
| 2,211,339 | 8/1940 | McNally et al. | 260/193 |
| 2,556,743 | 6/1951 | Long et al. | 260/193 X |
| 2,670,265 | 2/1954 | Heyna et al. | 8/49 |
| 2,863,860 | 12/1958 | Mitchell et al. | 260/193 |
| 2,969,351 | 4/1961 | Grossmann | 260/193 X |
| 3,346,553 | 10/1967 | Kuhne et al. | 260/193 X |
| 3,360,509 | 12/1967 | Scherer et al. | 260/193 X |
| 3,419,541 | 12/1968 | Kuhne et al. | 260/193 X |
| 3,519,616 | 7/1970 | Bauer et al. | 260/193 |
| 3,655,642 | 4/1972 | Meininger et al. | 260/194 |
| 3,692,463 | 9/1972 | Back et al. | 260/193 X |

*Primary Examiner*—Charles F. Warren
*Attorney, Agent, or Firm*—Curtis, Morris & Safford

[57] ABSTRACT
Water-soluble monoazo-dyestuff of the formula

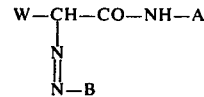

in which W is —CN or —CO—NH$_2$, A is ($\beta$-sulfatoethylsulfonyl)-phenylene, ($\beta$-sulfatoethylsulfonyl)-di(lower) alkyl-phenylene, ($\beta$-sulfatoethylsulfonyl)-lower alkyl-lower alkoxy-phenylene, ($\beta$-sulfatoethylsulfonyl)-lower alkoxy-phenylene, ($\beta$-sulfatoethylsulfonyl)-monosulfo-naphthylene, monosulfo-di(lower) alkoxy-phenylene, monosulfo-lower alkoxy-lower alkyl-phenylene, disulfo-phenylene or disulfo-naphthylene, and B is disulfo-phenylene, monosulfo-di(lower) alkoxy-phenylene, monosulfo-lower alkxoy-lower-alkyl-phenylene, disulfo-lower alkoxy-phenylene, disulfo-naphthylene, trisulfo-naphthylene, ($\beta$-sulfatoethylsulfonyl)-lower alkoxy-lower alkyl-phenylene, ($\beta$-sulfatoethylsulfonyl)-lower alkoxy-phenylene, ($\beta$-sulfatoethylsulfonyl)-naphthylene,

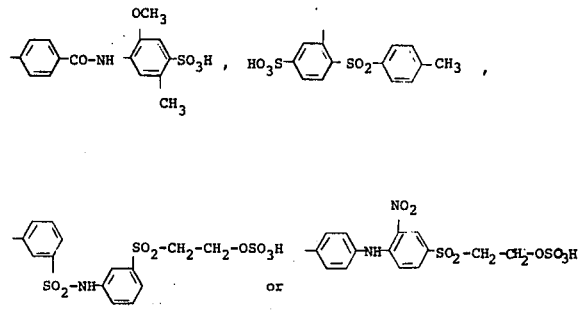

9 Claims, No Drawings

WATER-SOLUBLE REACTIVE DYESTUFFS OF THE MONOAZO SERIES CONTAINING AN ACTIVE METHYLENE COUPLING COMPONENT

The present invention relates to novel water-soluble reactive dyestuffs of the monoazo series which correspond to the general formula (1)

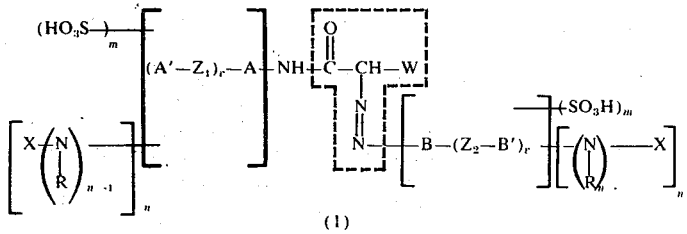

(1)

in which the atom grouping within the area encompassed by the dashed line may be present in enolised form or in the form of a hydrazone structure, A, A', B and B' respresent benzene and naphthalene radicals which may carry further substituents usual in azo dyestuffs, W represents a $-C \equiv N$ or $-CO-NH_2$ group and $Z_1$ and $Z_2$ represent a direct bond or a bivalent bridge member, for example $-NHCO-$, $-COHN-$, $-CON-$(lower alkyl)$-$, $-NHSO_2-$, $-N-$ (lower alkyl)$-SO_2-$, $-CO-$, $-SO_2-$, $-NH-$, $-S-$, $-O-$, or lower alkylene and may be identical or different, the lower alkyl containing 1 to 4 carbon atoms, for example methyl, ethyl, propyl, and the lower alkylene containing 1 to 4 carbon atoms, for example methylene, ethylene, X and $X_1$ each represent a reactive group which may be identical or different, $m$ and $m_1$ represent 0, 1, 2 or 3, the sum of $m + m_1$ being at least 1, $n$ and $n_1$ represent 0, 1 or 2 and the sum of $n + n_1$ being at least 1 and at most 3, $v$ and $v_1$ represent 0 or 1, R represents hydrogen or lower alkyl or an alkyl group substituted by $-OH$, $-COOH$, $-COO$(lower alkyl) or $-CN-$, the term lower alkyl having the meaning given above and both R may be identical or different, and $n_2$ and $n_3$ represent 1 or 2.

The invention furthermore relates to a process for preparing the above-specified dyestuffs, wherein diazotized amines of the general formula (2)

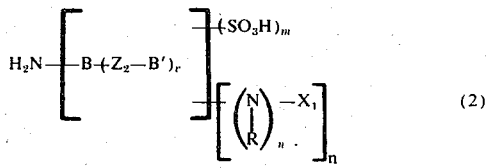

(2)

in which B, B', $Z_2$, $v_1$, R, $X_1$, $m_1$, $n$ and $n_3$ have the meanings given above, are coupled with coupling components of the general formula (3)

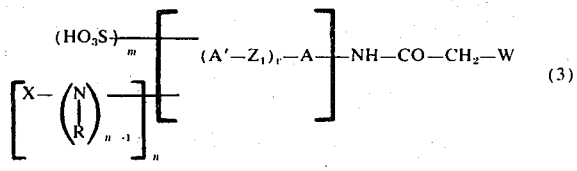

(3)

in which A, A', $Z_i$, $v$, W, X, R, $m$, $n$ and $n_2$ have the meanings given above, in a weakly acid range, for example at a pH-value of 3 to 4, and selecting the components in such a manner that the sum of the reactive groups is at least 1 and at most 3 per dyestuff molecule.

Under reactive groups X and $X_1$, there are to be understood groups which contain one or several reactive groups or substituents which may be split off and which, upon application of the dyestuffs on cellulose materials in the presence of acid-binding agents under the action of heat, are capable of reacting with the hydroxyl groups of the cellulose or upon application on polyamide fibers and wool, with the NH-groups of these fibers under formation of covalent bonds. A great number of such fiber-reactive groupings is known from literature.

Reactive groups which are suitable for the process of the invention and which contain at least one substituent that can be split off and is bound to a heterocyclic or an aliphatic radical are, among others, those which contain at least one reactive substituent bound to a 5- or 6-membered heterocycle, for example to a monazine, diazine, triazine, for example pyridine, pyrimidine, pyridazine, pyrazine, thiazine, oxazine or asymmetric or symmetric triazine ring or to such a ring system which has one or several annulated aromatic rings, for example the quinoline, phthalizine, cinnoline, quinazoline, quinoxaline, acridine, phenazine and phenanthridine ring system; The 5- or 6-membered heterocycles which contain at least one reactive substituent are preferably those which contain one or several nitrogen atoms and 5- or, preferably, 6-membered annulated carbocycles, The reactive substituents at the heterocycle are, for example halogen (Cl, Br or F), ammonium, including hydrazinium, sulfonium, sulfonyl, azido-($N_3$), rhodanido, thio, thio ether, oxy-ether, sulfinic acid and sulfonic acid. In particular, there are mentioned by way of example, mono- or dihalogeno-symmetric triazinyl radicals, for example 2,4-dichlorotriazinyl-6, 2-amino-4-chlorotriazinyl-6, 2 -alkyl-amino-4-chlorotriazinyl-6, such as 2-methyl-amino-4-chlorotriazinyl-6, 2-ethylamino- or 2-propylamino-4-chlorotriazinyl-6, 2β-oxethylamino-4-chlorotriazinyl-6, 2-di-β-oxethylamino-4-chlorotriazinyl-6 and the corresponding sulfuric acid semi-esters, 2-diethylamino-4-chlorotriazinyl-6, 2-morpholino- or 2-piperidino-4-chlorotriazinyl-6, 2-cyclohexylamino-4-chlorotriazinyl-6, 2-arylamino- and substituted arylamino-4-chlorotriazinyl-6 such as 2-phenylamino-4-chlorotriazinyl-6, 2-(o-, m- or p-carboxy- or sulfophenyl)-amino4-chlorotriazinyl-6, 2-alkoxy-4-chloro-triazinyl-6 such as 2-methoxy- or ethoxy-4-chlorotriazinyl-6, 2-aryloxy- and substituted aryloxy-4-chlorotriazinyl-6 such as 2-phenoxy-4-chlorotriazinyl-6, 2-(p-sulfophenyl)-oxy-4-chlorotriazinyl-6, 2-(o-, m- or p-methyl- or -methoxyphenyl)-oxy-4-chlorotriazinyl-6, 2-alkylmercapto- or 2-arylmercapto- or 2-(substituted aryl)-mercapto-4-chlorotriazinyl-6, such as 2-β-(hydroxyethyl)-mercapto-4-chlorotriazinyl-6, 2-phenylmercapto-4-chlorotriazinyl-6, 2-(4'-methylphenyl)-mercapto-4-chloro-triazinyl-6, 2-(2',4'- dinitro)-phenylmercapto-4-chlorotriazinyl-6, 2-methyl-4-chlorotriazinyl-6-, 2-phenyl-4-chloro-triazinyl-6, mono-, di- or tri-halogenopyrimidinyl radicals such as 2,4-dichloropyrimidinyl-6, 2,4,5-trichloropyrimidinyl-6, 2,4-dichloro-5-nitro- or 5-methyl-or -5-carboxymethyl- or -5-carboxy- or -5-cyano- or -5-vinyl- or -5-sulfo- or -5-mono, -di-, or -trichloromethyl- or -5-carboalkoxy-pyrimidinyl-6, 2,6-dichloropyrimidine-4-carbonyl, 2,4-dichloro-pyrimidine- 5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2-or 3-monochloroquinoxaline-6-sulfonyl, 2,3-dichloroquinoxaline-6-carbonyl, 2,3-dichloroquinoxaline-6-sulfonyl, 1,4-dichlorophthalazine-6-sulfonyl or -6-carbonyl, 2,4-dichloroquinazoline-7- or -6-sulfonyl or -6-carbonyl, 2- or 3- or 4-(4',5'-dichloropyridazone-6'-yl-1')-phenylslfonyl or carbonyl, β-(4',5'-dichloropyridazone-6'-yl-1')-ethylcarbonyl, N-methyl-N-(2,4-dichlorotriazinyl-6-)-carbamyl, N-methyl-N-(2-methyl-amino-4-chlorotriazinyl-6)-carbamyl, N-methyl-N-(2-dimethylamino-4-chlorotriazinyl-6)-carbamyl, N-methyl- or N-ethyl-N-(2,4-dichlorotriaziny-6-)-aminoacetyl, N-methyl-N-(2,3-dichloroquinoxaline-6-sulfonyl)-aminoacetyl, N-methyl-N-(2,3-dichloroquinoxaline-6-carbonyl)-aminoacetyl, as well as the corresponding bromo- and fluoro-derivatives of the above-mentioned chlorine-substituted heterocyclic radicals, among them, for example 2-fluoro-4-pyrimidinyl, 2,6-difluoro-4-pyrimidinyl, 2,6difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5-6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2;6-difluoro-5-nitro-4 -pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-5-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; triazine radicals which contain sulfonyl groups such as 2,4-bis-(phenylsulfonyl)-triazinyl-6-, 2-(3'-carboxyphenyl)-sulfonyl-4-chlorotriazinyl-6-, 2-(3'-sulfophenyl)-sulfonyl-4-chlorotriazinyl-6, 2,4-bis-(3'-carboxy-phenylsulfonyl-1')-triazinyl-6; pyrimidine rings which contain sulfonyl groups such as 2-carboxymethylsulfonyl-pyrimidinyl-4, 2-methylsulfonyl-6-methyl-pyrimidinyl-4, 2-methylsul-fonyl-6-ethyl-pyrimidinyl-4, 2-phenylsulfonyl-5-chloro-6-methyl-pyrimidinyl-4, 2,6-bis-methylsulfonyl-pyrimidinyl-4, 2,6-bis-methylsulfonyl-5-chloro-pyrimidinyl-4, 2,4-bis-methylsulfonyl-pyrimidine-5-sulfonyl, 2-methylsulfonyl-pyrimidinyl-4, 2-phenyl-sulfonylpyrimidinyl-4, 2-trichloromethylsulfonyl-6-methyl-pyrimidinyl-4, 2-methylsulfonyl-5-chloro-6-methyl-pyrimidinyl-4, 2-methylsulfonyl-5-bromo-6-methyl-pyrimidinyl-4, 2-methylsulfonyl-5-chloro-6-ethyl-pyrimidinyl-4, 2-methylsulfonyl-4-chloro-6-methyl-pyridinyl-4, 2-methylsulfonyl-4-chloro-6-methyl-pyrimidine-5-sulfonyl, 2-methylsulfonyl-5-nitro-6-methyl-pyrimidinyl-4-, 2,5,6-tris-methylsulfonyl-pyrimidinyl-4, 2-methylsulfonyl-5,6-dimethyl-pyrimidinyl-4, 2-ethylsulfonyl-5-chloro-6-methyl-pyrimidinyl-4, 2-methyl-sulfonyl-6-chloropyrimidinyl-4, 2,6 -bis-methylsulfonyl-5-chloro-pyrimidinyl-4, 2-methyl-sulfonyl-6-carboxy-pyridininyl-4, 2-methoxylsulfonyl-5-sulfo-pyrimidinyl-4-, 2methyl-sulfonyl 6-carbomethoxy-pyrimidinyl-4, 2-methylsulfonyl-5-carboxy-pyrimidinyl-4, 2-methylsulfonyl-5-cyano-6-methoxy-pyrimidinyl-4, 2-methylsulfonyl-5-chloro-pyrimidinyl-4, 2-sulfoethylsulfonyl-6-methyl-pyrimidinyl-4, 2-methylsulfonyl-5-bromo-pyrimidinyl-4, 2-phenylsulfonyl-5-chloro-pyrimidinyl-4, 2-carbomethylsulfonyl-5-chloro-6-methyl-pyrimidinyl-4, 2-methylsulfonyl-6-chloropyrimidine-4- or -5-carbonyl, 2,6-bis-(methylsulfonyl)-pyrimidine-4 or -5-carbonyl, 2--ethyl-sulfonyl-6-chloropyrimidine-5-carbonyl, 2,4-bis(methylsulfonyl)-pyrimidine-5-sulfonyl, 2-methylsulfonyl-4-chloro-6-methylpyrimidine-5-sulfonyl or -carbonyl; triazine rings which contain ammonium groups such as 2-trimethylammonium-4-phenylamino or -4-(o-, m-, or p-sulfophenyl)-aminotriazinyl-6, 2-(1,1-dimethylhydrazinium)-4-phenylamino- or -4-(o-, m- or p-sulfophenyl)-aminotriazinyl-6, 2-(2-isopropylidene-1,1-dimethyl)-hydrazinium-4-phenylamino- or -4-(o-, m- or p-sulfophenyl)-aminotriazinyl-6, 2-N-aminopyrrolidinium- or 2-N-amino-piperidinium-4-phenylamino- or -4-(o-, m- or p-sulfophenyl)-aminotriazinyl-6, furthermore- 4-phenylamino- or 4-(sulfophenylamino)-triazinyl-6 radicals which contain in the 2- position bound over nitrogen the 1,4-bis-azabicyclo-[2,2,2]-octane or the 1,2-bis-bicyclo-[0,3,3]-octane in a quaternary linkage, 2-pyridinium-4-phenylamino- or -4-(o-, m- or p-sulfophenyl-amino-triazinyl-6 as well as corresponding 2-onium-triazinyl-6 radicals which are substituted in the 4-position by alkylamino such as methylamino ethylamino or β-hydroxyethylamino or alkoxy such as methoxy or ethoxy or aroxy such as phenoxy or sulfophenoxy groups; 2-chloro-benzothiazole-5 or -6-carbonyl or -5- or -6-sulfonyl, 2-arylsulfonyl- or -alkylsulfonyl-benzothiazol-5- or - 6-carbonyl or -5- or -6-sulfonyl such as 2-methylsulfonyl- or 2-ethylsulfonyl-benzothiazol -5- or -6-sulfonyl or -carbonyl, 2-phenylsulfonyl-benzothiazol -5- or 6-sulfonyl or -carbonyl- and the corresponding 2-sulfonylbenzothiazol- 5- or -6-carbonyl or -sulfonyl derivatives which contain sulfo-groups in the annulated benzene ring, 2-chlorobenzoxazol-5- or -6-carbonyl or -sulfonyl-, 2-chloro- benzimidazol-5- or 6-carbonyl or -sulfonyl-, 2-chloro-4-methyl thioazol-(1,3)-5-carbonyl- or -4- or -5-sulfonyl, N-oxide of 4-chloro- or 4-nitroquinoline-5-carbonyl.

Furthermore, there may be mentioned reactive groups of the aliphatic series such as acryloyl-, mono-, di- or trichloroacryloyl, for example —CO—CH=λCH—Cl, —CO—CCl=CH$_2$, —CO—CCl=Ch—CH0hd 3, furthermore —CO—CCl=CH—COOH, —CO—CH=CCl'COOH, β-chloropropionyl, 3-methylsulfonylpropionyl, β-hydroxyethylsulfonyl, β-thiosulfatoethylsulfonyl, β-dialkylaminoethylsulfonyl, β-sulfatoethylaminosulfonyl, vinylsulfonyl, β-chloroethylsulfonyl, β-sulfatoethylsulfonyl, β-methylsulfonylethylsulfonyl, β-phenylsulfonylethylsulfonyl, 2-fluoro-2-chloro-3,3-difluorocyclobutane-1-carbonyl, 2,2,3,3-tetrafluoro-4-methyl-cyclobutyl)-acryloyl, α- or β-methylsulfonylacryloyl, as well as the β-chloroethylsulfonylendomethylene-cyclohexyloyl group.

The radicals A, A', B and B' may contain the substituents usual in azo dyestuffs such as alkyl, alkoxy, hydroxy, acylamino, nitro, cyano, carboxy, sulfonamido groups, halogen atoms such as fluorine, chlorine and bromine atoms etc.

The compounds of the formula (3) used as coupling components may be prepared according to known processes, for example by reacting cyano-acetic acid halides, preferably cyanoacetic acid chloride, with amines of the general formula (4)

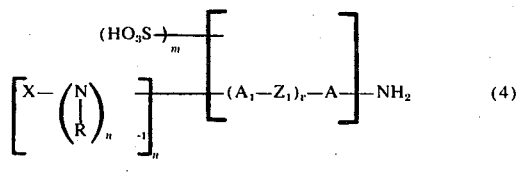

and, if required, supsequently saponofying the cyanide group to the carbonamido group.

The dyestuffs of the invention corresponding to the formula (1) may also be prepared by condensing the grouping

in dyestuffs of the general formula (5)

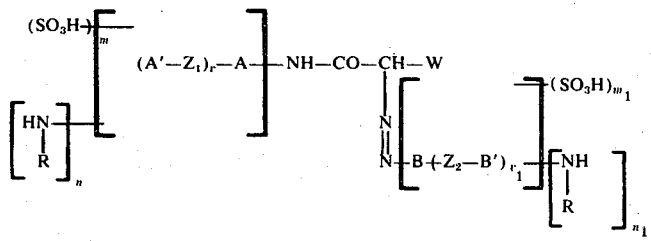

in which A, A', B, B', $Z_1$, $Z_2$, $v$, $v_1$, W, $m$, $m_1$, $n$, $n_1$ and R have the meanings given above, with a reactive component of the general formula (6a) and/or (6b)

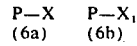

in which X and $X_i$ have the meanings given above and P represents a substituent which can be slit off and thereby converting it into a grouping of the formula (7a) and/or (7b)

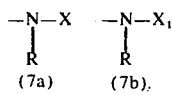

Reactive components of the formula (6a) or (6b) are, for example, those from which the mentioned reactive groups X and $X_1$ are derived, i.e. in general the halides, in particular the chlorides of the mentioned acyl components. From the great number of compounds which may be used in this respect, there may be mentioned: trihalogeno-symmetric-triazines, such as cyanur chloride and cyanur bromide, dihalogenomonoamino- and mono-substituted amino-symmetrictriazines such as 2,6-dichloro-4-aminotriazine, 2,6-dichloro-4-methylaminotriazine, 2,6-dichloro-4-ethylaminotriazine, 2,6-dichloro-4oxethylaminotrazine, 2,6-dichloro-4-phenylaminotriazine, 2,6-dichloro-4-(o-, m-or p-sulfo-phenyl)-aminotriazine, 2,6-dichloro-4-(2', 3'-, -2', 4'-, -3', 4'- or -3', 5' -disulfophenyl)-aminotriazine, dihalogenoalkoxy- and aryloxy-sym-triazines such as 2,6-dichloro-4-methoxytriazine, 2,6-dichloro-4-ethoxy-triazine, 2,6-dichloro-4-phenoxy-triazine, 2,6-dichloro-4-(o-, m- or p-sulfophenyl)-oxytriazine, dihalogeno-alkylmercypto- and arylmercapto-sym-triazines such as 2,6-dichloro-4-ethylmercaptotriazine, 2,6-dichloro-4-phenylmercaptotriazine, 2,6-dichloro-4-(p-methylphenyl)-mercaptotriazine; tetrahalogenopyrimidines such as tetrachloro-, tetrabromo- or tetrafluoro-pyrimidine, 2,4,6-trihalogenopyrimidines such as 2,4,6-trichloro-, tribromo- or trifluoro-pyrimidine, dihalogenopyrimidines such as 2,4-dichloro-, dibromo or -difluoropyrimidine; 2,4,6-trichloro-5-nitro- or -5-methyl- or -5-carbomethoxy- or -5-carboethoxy- or -5-carboxymethyl- or -5-mono-, -di- or -trichloromethyl- or -5-carboxy- or -5-sulfo- or -5-cyano- or -5-vinylpyrimidine, 2,4-difluoro-6-methylpyrimidine, 2,6-difluoro-4-methyl-5-chloropyrimidine, 2,4-difluoro-pyrimidine-5-ethylsulfone, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -dibromopyrimidine, 4,6-difluoro-2,5-dichloro- or -dibromopyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoropyrimidine-5-carboxylic acid alkyl esters or -5-carboxylic acid amides, 2,6-difluoro-5-methyl-4-chloro-pyrimidine, 2,6-difluoro-5-chloropyrimidine, 2,4,6-trifluoro-5-methylpyrimidine, 2,4,5-trifluoro-6-methyl-pyrimidine, 2,4-difluoro-5-nitro-6-chloropyrimidine, 2,4-difluoro-5-cyanopyrimidine, 2,4-difluoro-5-methylpyrimidine, 6-trifluoro-methyl-5-chloro-2,4-difluoro-pyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyrimidine, 2,4-difluoro-5-trifluoromethylpyrimidine, 2,4-difluoro-5-methylsulfonyl-4-pyrimidine, 2,4-difluoro-5-phenylpyrimidine, 2,4-difluoro-5-carbonamido-pyrimidine, 2,4-difluoro-5-carbomethoxy-pyrimidine, 2,4-difluoro-6-trifluoromethyl-pyrimidine, 2,4-difluoro-5-bromo-6-trifluoromethylpyrimidine, 2,4-difluoro-6-carbonamido-pyrimidine, 2,4-difluoro-6-carbo-methoxypyrimimidine, 2,4-difluoro-6-phenyl-pyrimidine, 2,4-difluoro-6-cyanopyrimidine, 2,4,6-trifluoro-5-methylsulfonyl-pyrimidine, 2,4-difluoro-5-sulfonamido-pyrimitine, 2,4-difluoro-5-chloro-6-carbomethoxypyrimidine, 5-trifluoromethyl-2,4-difluoropyrimidine, 2,4-dichloropyrmidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine- 5-carboxylic acid chloride, 2,6-dichloropyrimidine-4-carboxylic acid chloride; pyrimidine-reactive components with sulfonyl groups which can be split off such as 2-carboxymethylsulfonyl-4-chloropyrimidine, 2-methylsulfonyl-4-chloro-6-methylpyrimidine, 2,4-bis-methylsulfonyl-6-methylpyrimidine, 2,4-bis-phenylsulfonyl-5-chloro-6-methylpyrimidine, 2,4,6-trimethylsulfonyl-pyrimidine, 2,6-bis-methylsulfonyl-4,5-dichloropyrimidine, 2,4-bis-methylsulfonylpyrimidine-5-sulfonic acid chloride, 2-methylsulfonyl-4-chloro-pyrimidine, 2-phenylsulfonyl-4-chloropyrimidine, 2,4-bis-trichloromethylsulfonyl-6-methylpyrimidine, 2,4-bis-methylsulfonyl-5-chloro-6-methylpyrimidine, 2,4-bis-methylsulfonyl-5-bromo-6-methyl-pyrimidine, 2-methylsulfonyl-4,5-dichloro-6-methylpyrimidine, 2-methylsulfonyl-4,5-dichloro-6-chloromethylpyrimidine, 2-methylsulfonyl-4-chloro-6-methylpyrimidine-5-sulfonic acid chloride, 2-methylsulfonyl-4-chloro-5-nitro-6-methylpyrimidine, 2,4,5,6-tetramethylsulfonyl-pyrimidine, 2-methylsulfonyl-4-chloro-5,6-dimethylpyrimidine, 2-ethylsulfonyl-4,5-dichloro-6-methylpyrimidine, 2-methylsulfonyl-4,6-dichloropyrimidine, 2,4,6-trismethylsulfonyl-5-chloropyrimidine, 2-methylsulfonyl-4-chloro-6-carboxypyrimidine, 2-methylsulfonyl-4-chloropyrimidine-5-sulfonic acid, 2-methylsulfonyl-4-chloro-6-carbomethoxypyrimidine, 2-methylsulfonyl-4-chloro-pyrimidine-5-carboxylic acid, 2-methylsulfonyl-4-chloro-5-cyano-6-methoxypyrimidine, 2-methylsulfonyl-4,5-dichloropyrimidine, 4,6-bis-methylsulfonylpyrimidine, 4-methylsulfonyl-6-chloropyrimidine, 2-sulfoethylsulfonyl-4-chloro-6-methylpyrimidine, 2-methylsulfonyl-4-chloro-5-bromopyrimidine, 2-methylsulfonyl-4-chloro-5-bromo-6-methylpyrimidine, 2,4-bis-methylsulfonyl-5-chloropyrimidine, 2-phenylsulfonyl-4,5-dichloropyrimidine, 2-phenylsulfonyl-4,5-dichloro-6-methylpyrimidine, 2-carboxymethylsulfonyl-4,5-dichloro-6-methylpyrimidine, 2-(2'- or 3'- or 4' -carboxyphenylsulfonyl)-4,5-dichloro-6-methylpyrimidine, 2,4-bis-(2'- or 3'- or 4'-carboxyphenylsulfonyl)-5-chloro-6-methylpyrimidine, 2-methylsulfonyl-6-chloropyrimidine-4- or -5-carboxylic acid chloride, 2-ethylsulfonyl-6-chloropyrimidine-4- or -5-carboxylic acid chloride, 2,6-bis-(methylsulfonyl)-pyrimidine-4-carboxylic acid chloride, 2-methylsulfonyl-6-methyl-4-chloro- or -4-bromopyrimidine-5-carboxylic acid chloride or -bromide, 2,6-bis-(methylsulfonyl)-4-chloropyrimidine-5-carboxylic acid chloride; further reactive components of the heterocyclic series with reactive sulfonyl substituents are for example 3,6-bis-phenylsulfonyl-pyridazine, 3-methylsulfonyl-6-chloropyridazine, 3,6-bis-trichloromethylsulfonyl-pyridazine, 3,6-bis-methylsulfonyl-4-methylpyridazine, 2,5,6-tris-methylsulfonylpyrazine, 2,4-bis-methylsulfonyl-1,3,5-triazine, 2,4-bis-methylsulfonyl-6-(3'-sulfophenylamino)-1,3,5-triazine, 2,4-bis-methylsulfonyl-6-N-methylanilino-1,3,5-triazine, 2,4-bis-methylsulfonyl-6-phenoxy-1,3,5-triazine, 2,4-bis-methylsulfonyl-6-trichloro-ethoxy-1,3,5-triazine, 2,4,6-tris-phenylsulfonyl-1,3,5-triazine, 2,4-bis-methylsulfonylquinazoline, 2,4-bis-trichloromethylsulfonylquinoline, 2,4-bis-carboxymethylsulfonyl-quinoline, 2,6-bis-(methylsulfonyl)-pyridine-4-carboxylic acid chloride and 1-(4'-chlorocarbonylphenyl- or 2'-chlorocarbonyl-ethyl)-4,5-bis-methylsulfonylpyridazone-(6); further heterocyclic reactive components with mobile halogen are among others 2- or 3-monochloroquinoxyline-6-carboxylic acid chloride or -6-sulfonic acid chloride, 2- or 3-monobromoquinoxyline-6-carboxylic acid bromide or -6 -sulfonic acide bromide, 2,3-dichloroquinoxyline-6-carboxylic acid chloride or -6-sulfonic acid chloride, 2,3-dibromoquinoxaline-6-carboxylic bromide or -6-sulfonic acid bromide, 1,4-dichlorophthalazine-6-carboxylic acid chloride or -6-sulfonic acid chloride and the corresponding bromine compounds, 2,4-dichloroquinazoline- 6- or -7-carboxylic acid chloride or -sulfonic acid chloride as well the corresponding bromine compounds, 2- or 3- or 4-4',5'-dichloropyridazone-6'-yl-1')-phenyl sulfonic acid chloride or carboxylic acid chloride as well as the corresponding bromine compounds, β-(4', 5' dichloropyridazone-6'-yl-1')-ethyl carboxylic acid chloride, 2-chloroquinoxaline-3-carboxylic acid chloride and the corresponding bromine compound, N-methyl-N-(2,4-dichlorotriazinyl-6)-carbamic acid chloride, N-methyl-N-(2-chloro-4-methylamino-triazinyl-6)-carbamic acid chloride, N-methyl-N-(2-chloro-4-dimethylamino-triazinyl-6)-carbamic acide chloride, N-Methyl- or N-ethyl-N-(2,4-dichlorotriazinyl -6)-aminoacetyl chloride, N-methyl-, N-ethyl- or N-hydroxy-ethyl-N-(2,3-dichloroquinoxaline-6-sulfonyl- or -6-carbonyl)-aminoacetyl chloride and the corresponding bromine derivatives, furthermore 2-chlorobenzothiazole-5- or -6-carboxylic acid chloride or -5- or -6-sulfonic acid chloride and the corresponding bromine compounds, 2-arylsulfonyl or 2-alkylsulfonyl-benzothiazole-5- or -6-carboxylic acid chloride or -5- or -6-sulfonic acid chloride, as well as 2-methylsulfonyl- or 2-ethylsulfonyl- or 2-phenylsulfonyl-benzothiazole-5- or -6-sulfonic acid chloride or -5- or -6-carboxylic acid chloride as well as the corresponding 2-sulfonylbenzothiazole derivatives which contain sulfonic acid groups in the annellabed benzene nucleus, 3,5-bis-methylsulfonyl-isothiazole-4-carboxylic acid chloride, 2-chlorobenzooxazole-5- or -6-carboxylic acid chloride or -sulfonic acid chloride and the corresponding bromine derivatives, 2-chlorobenzoimidazole-5- or -6-carboxylic acid chloride or sulfonic acid chloride and the corresponding bromine derivatives, 2-chloro-1-methylbenzimidazole-5- or -6-carboxylic acid chloride or -sulfonic acid chloride and the corresponding bromine derivatives, 2-chloro-4-methylthiazole-(1,3)-5-carboxylic acid chloride or -4- or 5-sulfonic acid chloride, 2- chlorothiazole-4- or -5-sulfonic acid chloride and the corresponding bromine derivatives.

From the series of aliphatic reactive components, there may be mentioned, for example, acrylic acid chloride, mono-, di- or trichloro-acrylic acid chloride, 3-chloropropionic acid chloride, 3-phenylsulfonyl-propionic acid chloride, 3-methylsulfonyl-propionic acid chloride, 3-ethylsulfonyl-propionic acid chloride, 3-chloroethane-sulfochloride, chloromethane-sulfochloride, 2-chloro-acetylchloride, 2,2,3,3-tetrafluorocyclobutane-1-carboxylic acid chloride. β-(2,2,3,3-tetrafluorocyclobutyl-1)-acrylic acid chloride, β-chloroethylsulfonyl-[2,2,1]-cycloheptane carboxylic acid chloride, β-(2,2,3,3-tetrafluoro-4-methyl-cyclobutyl-1)-acrylic acid chloride, β-(2,3,3-trifluoro-2-chloro-cyclobutane-1)-carboxylic acid chloride, β-methylsulfonyl-acrylic acid chloride, α-methylsulfonyl-acrylic acid chloride and α-bromo-acrylic acid chloride and β-bromo-acrylic acid chloride.

For preparing the coupling components (4), there may be used, for example amino-benzene-monosulfonic acids and aminobenzenedisulfonic acids which may contain further substituents, 1- or 2-amino-naphthalene-mono-, -di- or -trisulfonic acids which may contain further substituents. Furthermore, there may be used: 1-aminobenzene-3- or -4-β-hydroxyethylsulfone, 1-amino-2-methoxy-5-methylbenzene-4-β-hydroxyethylsulfone, 1-(4'-amino-benzoyl)-amino-2-carboxybenzene-5-β-hydroxyethylsulfone, 1-amino-2,5-di-methoxybenzene-4-β-hydroxyethylsulfone, 1-amino-2-methoxybenzene-5-β-hydroxyethylsulfone, 1-amino-4-methoxybenzene-3-β-hydroxyethylsulfone, 1-amino-2-carboxy-5-β-hydroxyethylsulfone, 2-aminonaphthalene-5-β-hydroxyethylsulfone, 2-amino-naphthalene-6-β-hydroxyethylsulfone, 2-amino-naphthalene-4,8-di-(β-hydroxyethylsulfone), 2-amino-8-(β-hydroxyethylsulfone)-naphthalene-6-sulfonic acid or its mono-sulfuric acid-, thio-sulfuric acid- and phosphoric acid esters. Furthermore, 1-aminobenzene-4-β-chloroethylsulfone, 1-amino-2-methoxy-5-vinylsulfone, 1-(4'-aminobenzoylamino)-phenyl-2,5-di-sulfonic acid, 2-(4'-aminobenzoylamino)-naphthalene-6,8-disulfonic acid, 2-(3'-aminophenyl-sulfamino)-benzoic acid, 2-(4'-aminobenzoylamino)-haphthalene-1,5-disulfonic acid, furthermore 1,4-diaminobenzene-2,5- or 2,6-disulfonic acid, 1,3-diaminobenzene-4-sulfonic acid and 1,4-diamino-benzene-3-sulfonic acid and their reaction products with a reactive component of the general formula (6a) or (6b).

As diazo components of the general formula (2), there may be used, for example, the following amino compounds: any amines of the benzene or naphthalene series, aminobenzene-monosulfonic acids, aminobenzene-disulfonic acids, which may contain further substituents, 1- or 2-aminonaphthalene-mono-, di- or trisulfonic acids which may contain further substituents.

Furthermore, there may be used:

1-aminobenzene-3- or -4-β-hydroxyethylsulfone, 1-amino-2-methoxy-5-methyl-benzene-4-β-hydroxyethylsulfone, 1-(4'-aminobenzoyl)-amino-2-carboxybenzene-5-β-hydroxyethylsulfone, 1-amino-2,5-dimethoxybenzene-4-β-hydroxyethylsulfone, 1-amino-2-methoxy-benzene-5-β-hydroxyethylsulfone, 1-amino-2-carboxybenzene-5-β-hydroxyethylsulfone, 1-amino-4-methoxybenzene-3-β-hydroxyethylsulfone, 2-aminonaphthalene-5-β-hydroxyethylsulfone, 2-amino-naphthalene-6-β-hydroxyethylsulfone, 2-aminonaphthalene-4,8-di-(β-hydroxyethylsulfone), 2-amino-8-(β-hydroxyethylsulfone)-naphthalene-6-sulfonic acid or their sulfuric acid mono esters, thio-sulfuric acid esters and phosphoric acid esters. Furthermore 1-aminobenzene -β-chloroethylsulfone, 1-amino-2-methoxybenzene-5-vinylsulfone, 1-(4'-amino-benzoylamino)-phenyl-2,5-disulfonic acid, 2-(4'-amino-benzoyl-amino)-naphthalene-6,8-disulfonic acid, 2-(3'-aminophenylsulfamino)-benzoic acid, 2-(4'-aminobenzoylamino)-naphthalene-1,5- disulfonic acid. Furthermore, 1,3-diaminobenzene-4-sulfonic acid and 1,4-diaminobenzene-3-sulfonic acid, 1,4-diaminobenzene-2,5- or -2,6-disulfonic acid and their reaction products, with a reactive component of the general formula (6a) or (6b).

The dyestuffs of the general formula (1) in which W represents a –CONH$_2$ group can be obtained, for example, by dissolving coupling components of the formula (3) in which W stands for a –CN–group in 96% by weight sulfuric acid and stirring for some hours at room temperature. Any possibly present β-hydroxyethylsulfonyl group standing for X in formula (3) is thereby converted into the acid mono-sulfuric acid ester. The coupling component is isolated by introducing it with stirring into ice powder and coupling it with a diazotized amine of the general formula (2) in a weakly acid range, for example at a pH-value of 3–4.

The dyestuffs of the formula (1) in which W represents a –CONH$_2$ group may also be prepared by dissolving, for example, dyestuffs of the formula (1) in which W represents a –CN group in 96% by weight sulfuric acid and stirring for some hours at room temperature. Any present β-hydroxyethylsulfonyl group in formula (1) standing for X or $X_1$ is thereby converted into the mono-sulfuric acid ester. Isolation of the dyestuff is carried out by introducing the sulfuric acid solution into ice powder and precipitating the dyestuff with potassium or sodium chloride.

The monoazo dyestuffs of the formula (1) obtained according to the invention are well suited for the dyeing and printing of various materials, for example wool, silk, leather, polyamide or polyurethane fibers, but especially materials which contain cellulose, for example cotton, fibers from regenerated cellulose and linnen. They can be applied according to all dyeing and printing methods usually employed for reactive dyestuffs and yield on cellulose materials, in the presence of agents having an alkaline action, brillant and very greenish yellow shades that have good properties with regard to processing and use. The very high fastness to light, good fastness to wet processing such as the fastness to washing, the fastness to water and to prespiration, to chlorinated bathing water and to chlorine bleaching must be particularly pointed out. For textile printing, the excellent stability of the alkaline printing pastes, the sharpness of the outlines and the non-staining of the white ground are of particular interest. If they are applied according to the padding process, the high solubility and the good stability of the alkaline padding liquors produced with the dyestuffs of the invention is very advantageous.

The following Examples illustrate the invention:

EXAMPLE 1

23.3 Parts by weight of 1-amino-2,5-dimethoxy-benzene-4-sulfonic acid were stirred into 200 parts by weight of water, and then 200 parts by weight of ice-powder and 15 parts by weight of 37% by weight hydrochloric acid were added and diazotization was effected at 0°–5° C with 17.3 parts by weight of 40% by weight sodium nitrite solution.

34.8 parts by weight of cyanoacetic acid-(4-β-sulfatoethylsulfonyl-anilide) were introduced into the suspension of the diazonium salt. The pH-value was adjusted to 3.8–4 by the addition of crystallized sodium acetate and the whole was stirred until the formation of the dyestuff was completed. The dyestuff was isolated by salting out with sodium chloride. The dyestuff that had precipitated was filtered off with suction and dried in a vacuum drier at 50° C to 60° C. A yellow powder was obtained which dissolved in water to give a yellow solution. In the form of the free acid, the dyestuff had the following composition:

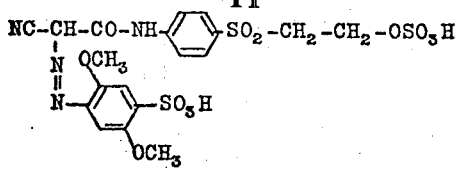

It yielded on fibers of native and regenerated cellulose, in the presence of sodium carbonate, intense brilliant greenish yellow dyeings and prints which have very good fastness to wet processing and very good fastness to light.

EXAMPLE 2

23.3 Parts by weight of 1-amino-2,5-dimethoxy-benzene-4-sulfonic acid were diazotized as described in Example 1.

25.6 Parts by weight of cyanoacetic acid-(4-β-hydroxyethylsulfonyl)-anilide were introduced into the diazo suspension. The pH-value was adjusted to 3.8–4 by the addition of sodium acetate and the whole was stirred until coupling was completed. Precipitation of the dyestuff was completed by the addition of sodium chloride. The dyestuff was filtered off and dried at 70°–80° C in a vacuum drier. The dyestuff was then pulverized, introduced into 250 parts by weight of 96% by weight sulfuric acid and the whole was stirred for 15 hours at room temperature. During that time, the —CN—group was converted into the —CONH$_2$ group and the —SO$_2$CH$_2$CH$_2$OH-group was converted into the monosulfuric acid ester. The reaction mixture was then poured onto 500 parts by weight of ice-powder. The dyestuff was precipitated by the addition of sodium chloride, filtered off and washed with a 20% by weight sodium chloride solution until it was neutral and finally dried at 50°–60° C in a vacuum drier. A yellow powder was obtained which dissolved in water to give a yellow solution. The dyestuff obtained which, in the form of the free acid, corresponding to the formula

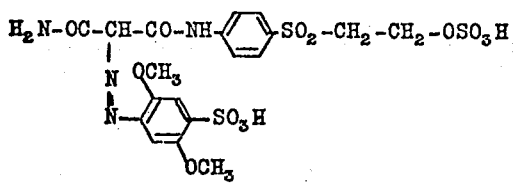

was found to yield on fibers of native and regenerated cellulose, in the presence of agents having an alkaline action, brilliant greenish yellow dyeings which have very good fastness to wet processing and to light.

EXAMPLE 3 a. 23.3 Parts by weight of cyanoacetic acid-(4-β-hydroxyethyl-sulfonyl)-anilide were introduced into 150 parts by weight of 96% by weight sulfuric acid and the whole was stirred for al 5 hours at room temperature. During that time the CN-group was converted into the —CONH$_2$ group and the —SO$_2$CH$_2$—CH$_2$—OH-group was converted into the monosulfuric acid ester. The sulfuric acid solution was then stirred into 300 parts by weight of ice.

b. 21.7 Parts by weight of 1-amino-2-methoxy-5-methylbenzene-4-sulfonic acid were stirred in 200 parts by weight of water, the 200 parts by weight of ice powder and 15 parts by weight of 37% by weight hydrochloric acid were added and diazotization was carried out at −10° C with 17.3 parts by weight of a 40% by weight sodium nitrite solution.

The solution of N-(4-β-sulfatoethyl-sulfonyl-phenyl)-malonic acid diamide obtained according to a), was then stirred into the suspension of the diazonium salt so prepared. The pH-value of the coupling mixture was adjusted to 4 by the addition of crystallized sodium acetate and the whole was stirred until the formation of the dyestuff was completed. The dyestuff was isolated by salting out with potassium chloride. The dyestuff that had precipitated was filtered off and dried at 50°–60° C in a vacuum drier. The dyestuff which in the form of the free acid corresponding to the formula

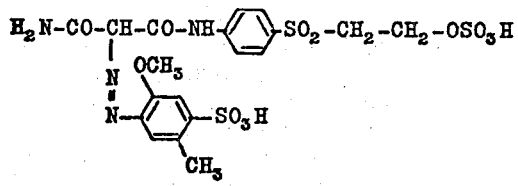

constituted a yellow powder which dissolved in water to give a yellow solution. It yielded on fibers of native and regenerated cellulose, in the presence of sodium carbonate, brilliant, very greenish yellow dyeings and prints that had very good fastness to washing and to light.

EXAMPLE 4

32.5 Parts by weight of 1-amino-2-methoxy-5-methylbenzene-4-β-hydroxyethylsulfone-sulfuric acid ester were introduced into 200 parts by weight of water, then 200 parts by weight of ice-powder and 15 parts by weight of 37% by weight hydrochloric acid were added and diazotization was carried out at 0°–10° C with 17.3 parts by weight of 40% by weight of sodium nitrite solution.

36.2 Parts by weight of cyanoacetic acid-2-naphthylamide-6,8-disulfonic acid were strewn into this diazonium salt solution. The pH-value was adjusted to 3.8–4.0 by the addition of crystallized sodium acetate and the whole was stirred until the formation of dyestuff was completed. The dyestuff was isolated by salting out with sodium chloride. The dyestuff that had precipitated was filtered off and dried at 50°–60° C in a vacuum drier. A yellow powder was obtained which dissolved in water to give a yellow solution. The dyestuff which in the form of the free acid corresponded to the formula

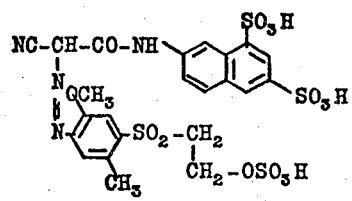

was found to yield on fibers of native and regenerated cellulose in the presence of sodium carbonate clear greenish yellow dyeings which had very good fastness to washing and to light.

When using, instead of 32.5 parts by weight of 1-amino-2-methoxy-5-methylbenzene-4-β-hydroxyethyl-sulfone-sulfuric acid ester, 34.1 parts by weight of 1-amino-2-methoxy-5-methylbenzene-4-β-thiosulfatoethylsulfone, a dyestuff which similarly good properties was obtained.

EXAMPLE 5

23.3 Parts by weight of 1-amino-2,5-dimethoxybenzene-4-sulfonic acid were diazotized as described in Example 1.

40.8 Parts by weight of cyanoacetic acid-(2,5-dimethoxy-4-β-sulfatoethylsulfonyl-anilide) were introduced into the suspension of the diazonium salt. The pH-value was adjusted to 3.8–4 by the addition of crystallized sodium acetate and the ewhole was stirred until the formation of the dyestuff was completed. The dyestuff was isolated by salting out with potassium chloride. The dyestuff that had precipitated was filtered off and dried at 50°–60° C in a vacuum drier. The dyestuff which was obtained as yellow powder dissolved in water to give a yellow solution and corresponded, in the form of the free acid, to the following formula:

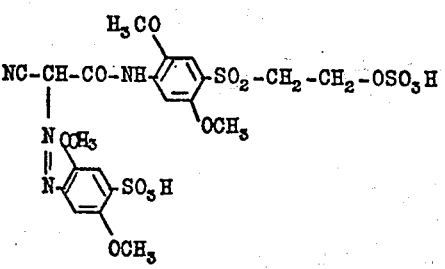

The dyestuff yielded on fibers of native and regenerated cellulose, in the presence of sodium carbonate, intense, brilliant, greenish yellow dyeings and prints which had very good fastness to wet processing and very good fastness to light.

EXAMPLE 6

38.2 Parts by weight of 1-[β-(2', 2', 3', 3'-tetrafluoro-4'-methyl-cyclobutyl)-acroylamino]-3-aminobenzene-4-sulfonic acid were introduced into 200 parts by weight of water, then 200 parts by weight of ice-powder and 15 parts by weight of 37% by weight hydrochloric acid were added and diazotization was carried out with 17.3 parts by weight of 40% by weight sodium nitrite solution.

34.8 Parts by weight of cyanoacetic acid-2-naphthylamide-5,7-disulfonic acid were introduced into the solution of the diazonium salt. The pH-value was adjusted to 3.8–4 by the addition of crystallized sodium acetate and the coupling mixture was stirred until the formation of the dyestuff was completed. The dyestuff was then precipitated with the aid of potassium chloride, filtered off and dried at 50°–60° C in a vacuum drier. A yellow powder was obtained which dissolved in water to give a yellow solution. The dyestuff obtained, which in the form of the free acid corresponded to the formula yielded on cellulose fibers in the presence of agents having an alkaline action brilliant yellow dyeings and prints, which had very good fastness to washing and to light.

Valuable dyestuffs which dye cotton yellow shades are likewise obtained when using, instead of the 1-[β-(2', 2',3', 3'-tetrafluoro-4'-methyl-cyclobutyl)-acryloylamino]-3-aminobenzene-4-sulfonic acid, 27.2 parts by weight of 1-(2'-chloro-4'-amino-triazinyl-6'-amino)-3-amino-benzene-4-sulfonic acid or 41.3 parts by weight of 1-(2',3'-dichloro-quinoxaline-6'-carbonyl-amino)-3-amino-benzene-4-sulfonic acid.

EXAMPLE 7

37.0 Parts by weight of 1-[β-(2', 2', 3', 3'-tetrafluoro-cyclobutyl)-acryloylamino]-4-aminobenzene-3-sulfonic acid were diazotized as described in Example 6.

32.0 Parts by weight of cyanoacetic acid-anilide-2,5-disulfonic acid were introduced into the suspension of the diazonium salt and coupling is carried out at a pH-value of 3.8 to 4 with the addition of crystallized sodium acetate. Stirring was continued until the formation of the dyestuff was completed. The dyestuff was then salted out by adding sodium chloride, filtered off and dried at 50°–60° C in a vacuum drier. A yellow dyestuff powder was obtained, which was found to be easily soluble in water and which, in the form of the free sulfonic acid, corresponded to the following formula:

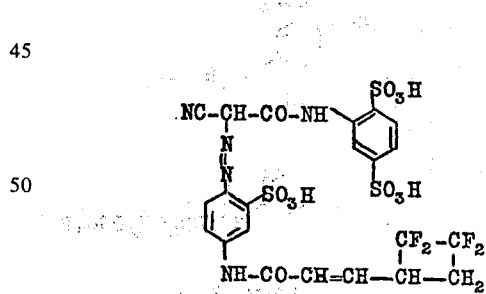

When applied according to a method usually employed for reactive dyestuffs, clear greenish yellow were obtained on cellulose-containing material which had very good fastness to wet processing and to light.

The dyestuffs listed in the following table can be prepared in similar manner as that described in the foregoing examples. Then yield on cellulose materials likewise yellow to greenish yellow dyeings and prints with similarly good properties of fastness.

| Coupling component | Diazo component |
|---|---|
| 1) 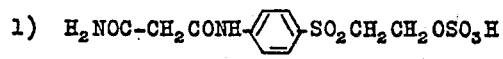 | 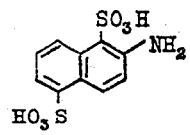 |
| 2) 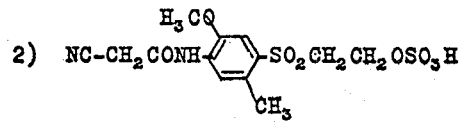 | 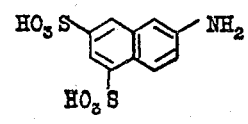 |
| 3) 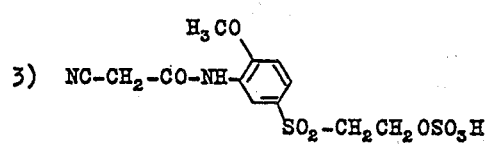 | 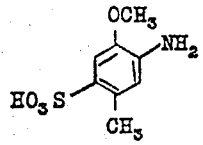 |
| 4) 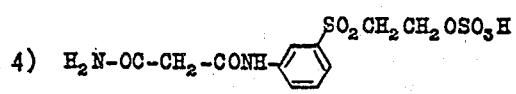 | 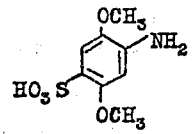 |
| 5) 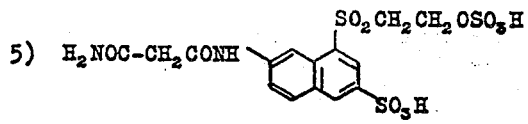 | 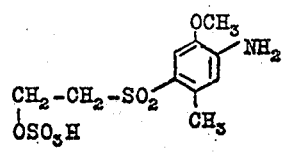 |
| 6) 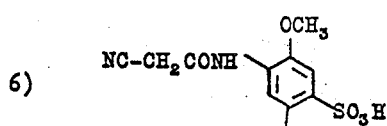 | 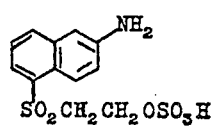 |
| 7) 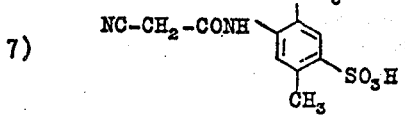 | 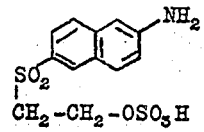 |
| 8) 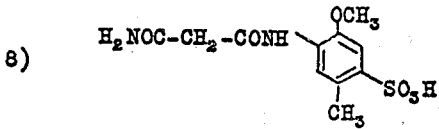 | 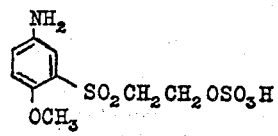 |
| 9)  | 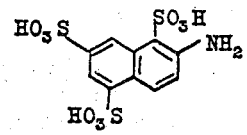 |
| 10) 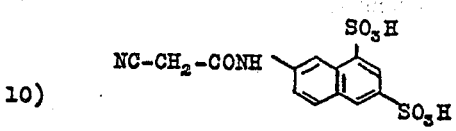 | 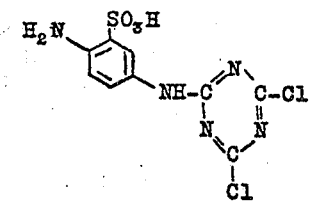 |
| 11) 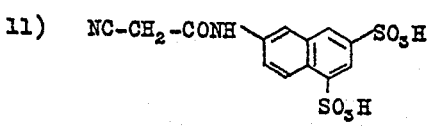 | 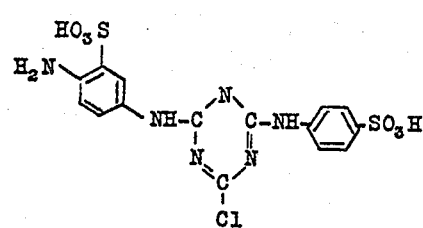 |

-continued

| | Coupling component | Diazo component |
|---|---|---|
| 12) | NC-CH₂-CONH-(2,5-dimethoxy-4-sulfo-phenyl) | HO₃S-(aminophenyl)-NH-(triazine-Cl)-NH-(phenyl)-COOH |
| 13) | NC-CH₂-CONH-(naphthyl-1,3-disulfonic acid) | HO₃S-(aminophenyl)-NH-(triazine-Cl₂) |
| 14) | H₂N-OC-CH₂-CONH-(2-methoxy-4-methyl-5-sulfo-phenyl) | HO₃S-(aminophenyl)-NHCO-(quinoxaline-Cl₂) |
| 15) | NC-CH₂-CONH-⟨phenyl⟩-SO₂-CH₂-CH₂-OSO₃H | HO₃S-(amino-methoxy-sulfo-phenyl) |
| 16) | H₂N-OC-CH₂-CONH-⟨phenyl⟩-SO₂-CH₂-CH₂OSO₃H | HO₃S-(aminophenyl)-NH-(triazine-Cl)-NH-(phenyl)-COOH |
| 17) | NC-CH₂-CONH-(naphthyl-1,3-disulfonic acid) | HO₃SO-CH₂-CH₂-O₂S-(benzothiazol)-NH₂ |
| 18) | NC-CH₂-CO-NH-⟨phenyl⟩-SO₂-CH₂-CH₂-OSO₃H | H₂N-⟨phenyl⟩-CO-NH-(2-methoxy-5-methyl-sulfo-phenyl) |
| 19) | H₂N-CO-CH₂-CO-NH-(2-methoxy-5-methoxy-sulfo-phenyl) | H₂N-⟨phenyl⟩(SO₂-NH-⟨phenyl⟩-SO₂-CH₂-CH₂-OSO₃H) |
| 20) | NC-CH₂-CO-NH-(2-methoxy-5-methoxy-sulfo-phenyl) | H₂N-⟨phenyl⟩-NH-(nitro-phenyl)-SO₂-CH₂-CH₂-OSO₃H |
| 21) | H₂N-CO-CH₂-CO-NH-⟨phenyl⟩-SO₂-CH₂-CH₂OSO₃H | HO₃S-(amino-phenyl)-SO₂-⟨phenyl⟩-CH₃ |
| 22) | NC-CH₂-CO-NH-⟨phenyl⟩(SO₂-NH-⟨phenyl⟩-SO₂-CH₂-CH₂-OSO₃H) | H₂N-(amino-disulfo-phenyl) |

We claim:
1. A water-soluble monoazodyestuff of the formula

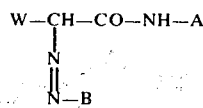

in which W is —CN or —CO—NH$_2$, A is β-sulfatoethylsulfonylphenyl, dimethoxy-(β-sulfatoethylsulfonyl)-phenyl, methylmethoxy-(β-sulfatoethylsulfonyl)-phenyl, methoxy-(β-sulfatoethylsulfonyl)-phenyl, dimethoxy-sulfo-phenyl, methyl-methoxysulfophenyl, disulfonaphthyl, sulfo-(β-sulfatoethylsulfonyl)-naphthyl or (β-sulfatoethylsulfonyl-phenyl)-aminosulfonyl-phenyl, B is dimethoxy-sulfo-phenyl, methyl-methoxy-sulfo-phenyl, disulfophenyl, methoxy-disulfophenyl, methyl-methoxy-(β-sulfatoethylsulfonyl)-phenyl, methoxy-(β-sulfatoethylsulfonyl)-phenyl, disulfonaphthyl, trisulfonaphthyl, sulfo-(β-sulfatoethylsulfonyl)-naphthyl, β-sulfatoethylsulfonyl-naphthyl, (methyl-methoxy-sulfo-phenyl)-amino-carbonyl-phenyl, (β-sulfatoethylsulfonyl-phenyl)-aminosulfonyl-phenyl, (β-sulfatoethylsulfonyl-nitro-phenyl)-aminophenyl or (methylphenyl)-sulfonyl-sulfophenyl.

2. A water-soluble monaozo dyestuff of the formula recited in claim 1 in which W is —CN or —CO—NH$_2$, A is β-sulfatoethylsulfonylphenyl, dimethoxy-(β-sulfatoethylsulfonyl)-phenyl, methyl-methoxy-(β-sulfatoethylsulfonyl)-phenyl, methoxy-(β-sulfatoethylsulfonyl)-phenyl, dimethoxy-sulfo-phenyl, methylmethoxy-sulfo-phenyl, disulfonaphthyl, or sulfo-(β-sulfatoethylsulfonyl)-naphthyl, B is dimethoxy-sulfo-phenyl, methyl-methoxy-sulfo-phenyl, disulfophenyl, methoxy-disulfophenyl, methyl-methoxy-(β-sulfatoethylsulfonyl)-phenyl, methoxy-(β-sulfatoethylsulfonyl)-phenyl, disulfonaphthyl, trisulfonaphthyl, sulfo-(β-sulfatoethylsulfonyl)-naphthyl, or β-sulfatoethylsulfonyl-naphthyl.

3. The dyestuff as claimed in claim 1 of the formula:

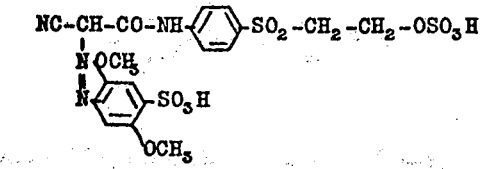

4. The dyestuff as claimed in claim 1 of the formula:

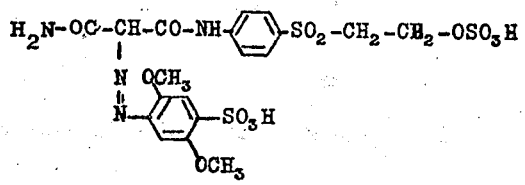

5. The dyestuff as claimed in claim 1 of the formula:

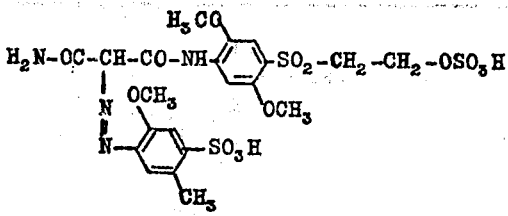

6. the dyestuff as claimed in claim 1 of the formula:

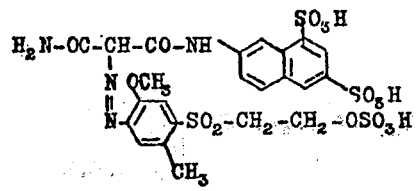

7. The dyestuff as claimed in claim 1 of the formula:

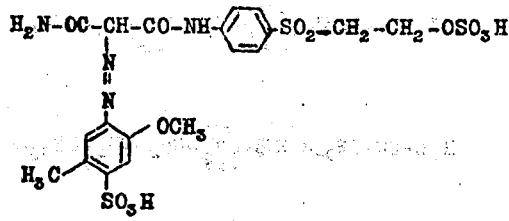

8. The dyestuff as claimed in claim 1 of the formula:

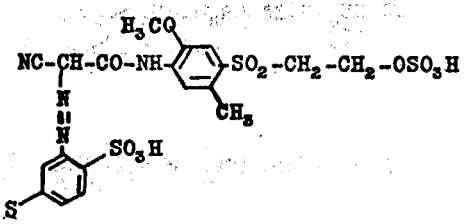

9. The dyestuff as claimed in claim 1 of the formula:

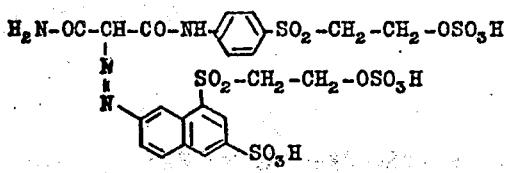

* * * * *